(12) United States Patent
Hatcher et al.

(10) Patent No.: US 9,038,954 B2
(45) Date of Patent: May 26, 2015

(54) REFUELING BOOM DISCONNECTION SYSTEM

(75) Inventors: Justin Cleve Hatcher, Renton, WA (US); Timothy Robert Brdar, Convington, WA (US)

(73) Assignee: THE BOEING COMPANY, Chicago, IL (US)

( * ) Notice: Subject to any disclaimer, the term of this patent is extended or adjusted under 35 U.S.C. 154(b) by 240 days.

(21) Appl. No.: 13/555,756

(22) Filed: Jul. 23, 2012

(65) Prior Publication Data

US 2014/0021300 A1    Jan. 23, 2014

(51) Int. Cl.
*B64D 39/06*    (2006.01)

(52) U.S. Cl.
CPC ................... *B64D 39/06* (2013.01)

(58) Field of Classification Search
CPC ....... B64D 39/06; G01C 23/00; G01C 23/005
USPC ................................................. 244/135 A
See application file for complete search history.

(56) References Cited

U.S. PATENT DOCUMENTS

| 4,025,193 | A | * | 5/1977 | Pond et al. .................... 356/5.1 |
| 4,129,270 | A | * | 12/1978 | Robinson et al. ......... 244/135 A |
| 4,150,803 | A | | 4/1979 | Fernandez |
| 5,785,276 | A | | 7/1998 | Ruzicka |
| 7,093,801 | B2 | | 8/2006 | Schroeder |
| 7,309,048 | B2 | * | 12/2007 | von Thal et al. ........... 244/135 A |
| 7,769,543 | B2 | * | 8/2010 | Stecko et al. ................. 701/476 |
| 7,850,121 | B2 | * | 12/2010 | Powell ....................... 244/135 A |
| 7,894,950 | B2 | * | 2/2011 | Williamson et al. ......... 701/29.8 |
| 8,019,492 | B2 | * | 9/2011 | Halaas ............................. 701/12 |
| 8,567,723 | B2 | * | 10/2013 | Etzkorn et al. ............. 244/135 A |
| 2007/0023575 | A1 | * | 2/2007 | von Thal et al. .......... 244/135 A |
| 2009/0095843 | A1 | * | 4/2009 | Powell ....................... 244/135 A |
| 2009/0248225 | A1 | * | 10/2009 | Stecko et al. ..................... 701/3 |
| 2009/0292406 | A1 | * | 11/2009 | Aparicio et al. .................. 701/3 |
| 2010/0256838 | A1 | * | 10/2010 | Stecko et al. ..................... 701/3 |
| 2013/0168498 | A1 | * | 7/2013 | Rix ........................... 244/135 A |

* cited by examiner

*Primary Examiner* — Brian M O'Hara
*Assistant Examiner* — Jessica Wong
(74) *Attorney, Agent, or Firm* — Yee & Associates, P.C.

(57) ABSTRACT

A method and apparatus comprising a refueling controller. The refueling controller is configured to receive data about a current rate of movement of a refueling boom while the refueling boom is in contact with a receiver aircraft during flight. The refueling controller is further configured to disconnect the refueling boom from the receiver aircraft based on the current rate of movement of the refueling boom and a current position of the refueling boom.

19 Claims, 9 Drawing Sheets

REFUELING BOOM DISCONNECTION SYSTEM

GOVERNMENT LICENSE RIGHTS

This application was made with United States Government support under contract number FA8625-C-11-6600 awarded by the United States Air Force. The United States Government has certain rights in this application.

BACKGROUND INFORMATION

1. Field

The present disclosure relates generally to aircraft and, in particular, to refueling aircraft. Still more particularly, the present disclosure relates to a method and apparatus for managing the disconnection of a boom for a refueling aircraft.

2. Background

Aerial refueling is the process of transferring fuel from one aircraft to another aircraft during flight. The aircraft from which the fuel originates is referred to as a tanker aircraft. The aircraft receiving the fuel is referred to as a receiver aircraft. This type of refueling process may be applied to various types of receiver aircraft, tanker aircraft, or both receiver aircraft and tanker aircraft. The various types of aircraft may include fixed wing aircraft, rotor wing aircraft, and other suitable types of aircraft.

One common approach for refueling aircraft during flight involves the use of a refueling boom and a receptacle system. A refueling boom may be comprised of a tube that is fixed onto a tanker aircraft or that may be a telescoping refueling boom on the tanker aircraft. The refueling boom may be attached to the rear of the tanker aircraft. This refueling boom may move along three axes relative to the aircraft. In some cases, the refueling boom also may be flexible. An operator may extend a refueling boom and also may reposition the refueling boom for insertion into a receptacle on the receiver aircraft. When the end of the refueling boom is inserted into a receptacle of the receiver aircraft, the refueling boom may then be considered to be connected to the receiver aircraft. When a connection is made, fuel may be transferred from the tanker aircraft to the receiver aircraft through the refueling boom.

During the refueling process, the position of the tanker aircraft and the receiver aircraft should be within some volume. This volume is a volume in which the refueling boom may move and transfer fuel as desired. When the refueling boom approaches a limit of the volume, disconnecting the refueling boom from the receiver aircraft is desirable to avoid undesired operation of the boom.

Disconnecting the refueling boom from the receiver aircraft may be caused by intervention from the operator, a system detecting the refueling boom approaching the limits of the volume, or a combination of the two. An operator may not always disconnect the refueling boom prior to the refueling boom reaching or passing the limit of the volume.

Further, with currently used refueling boom disconnection systems, the disconnection of the refueling boom from the receiver aircraft may occur during times at which the refueling boom may not need to be disconnected from the receiver aircraft. In other words, the system may be overly conservative as to when the refueling boom is disconnected from the receiver aircraft. Therefore, it would be desirable to have a method and apparatus that takes into account at least some of the issues discussed above, as well as possibly other issues.

SUMMARY

In one illustrative embodiment, an apparatus comprises a refueling controller. The refueling controller is configured to receive data about a current rate of movement of a refueling boom while the refueling boom is in contact with a receiver aircraft during flight. The refueling controller is further configured to disconnect the refueling boom from the receiver aircraft based on the current rate of movement of the refueling boom and a current position of the refueling boom.

In another illustrative embodiment, a refueling controller for a tanker aircraft comprises the refueling controller. The refueling controller is configured to receive data about a current rate of movement of a refueling boom within a volume selected for a receiver aircraft while the refueling boom is in contact with the receiver aircraft during flight. The refueling controller is further configured to identify a number of position limits based on the current rate of movement of the refueling boom. The refueling controller is further configured to determine whether the refueling boom has exceeded a position limit in the number of position limits based on a current position and the current rate of movement of the refueling boom. The refueling controller is further configured to disconnect the refueling boom of the receiver aircraft if the position limit in the number of position limits has been exceeded.

In yet another illustrative embodiment, a method for controlling disconnection of a refueling boom is presented. Data about a current rate of movement of the refueling boom is received while the refueling boom is in contact with a receiver aircraft during flight. The refueling boom is disconnected from the receiver aircraft based on the current rate of movement of the refueling boom and a current position of the refueling boom.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more considerations. For example, the illustrative embodiments recognize and take into account that a threshold may be set prior to the refueling boom reaching the limit of a volume to cause an automatic disconnect of the refueling boom from the receiver aircraft.

The illustrative embodiments also recognize and take into account that a rate of movement also may be used to determine when a refueling boom should be disconnected from a receiver aircraft. For example, if the rate of movement of the refueling boom is greater than a threshold value, the refueling boom may be disconnected from the receiver aircraft. However, this type of disconnection may result in the refueling boom being disconnected from the receiver aircraft even though the refueling boom is within the limit of the volume.

Thus, the illustrative embodiments provide a method and apparatus for managing a connection of a refueling boom to a receiver aircraft. In particular, one or more illustrative embodiments may be employed to manage the disconnection of the refueling boom from the receiver aircraft.

In one illustrative embodiment, an apparatus comprises a connection controller. The connection controller is configured to receive information about a current rate of movement of a refueling boom in a volume selected for a receiver aircraft while the refueling boom is in contact with the receiver aircraft during flight. The connection controller is further configured to disconnect the refueling boom from the receiver aircraft based on a current rate of movement of the refueling boom within the volume. This disconnection of the refueling boom is performed automatically. In other words, input from a human operator is unnecessary to disconnect the refueling boom.

Figure 1:
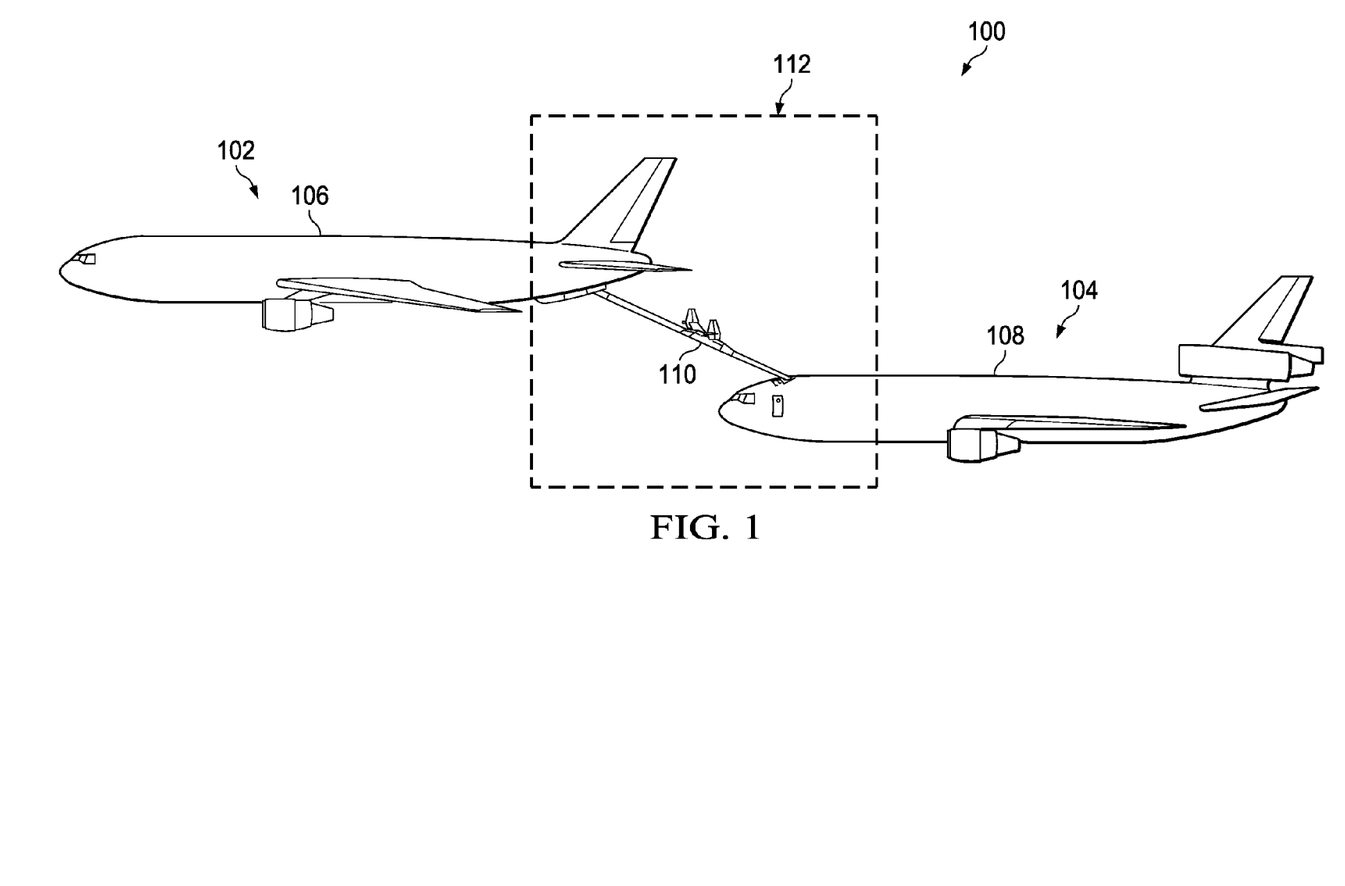
FIG. 1 is an illustration of a refueling environment in which an illustrative embodiment may be implemented.

With reference now to the figures and, in particular, with reference to FIG. 1, an illustration of a refueling environment is depicted in accordance with an illustrative embodiment. In this illustrative example, refueling environment 100 includes aircraft 102 transferring fuel to aircraft 104. Aircraft 102 is tanker aircraft 106, while aircraft 104 is receiver aircraft 108.

In these illustrative examples, refueling boom 110 on tanker aircraft 106 is connected to receiver aircraft 108. As depicted, fuel is transferred from tanker aircraft 106 to receiver aircraft 108 through refueling boom 110.

An illustrative embodiment may be implemented in tanker aircraft 106 to manage the connection between refueling boom 110 and receiver aircraft 108. In particular, one or more illustrative embodiments may be implemented in tanker aircraft 106 to manage the disconnection of refueling boom 110 from receiver aircraft 108. A more detailed illustration of refueling boom 110 in section 112 is depicted in FIG. 2.

In these illustrative examples, the disconnection of refueling boom 110 from receiver aircraft 108 may be performed automatically without needing input from a human operator. The disconnection of refueling boom 110 from receiver aircraft 108 may be based on a current rate of movement of refueling boom 110.

Figure 2:
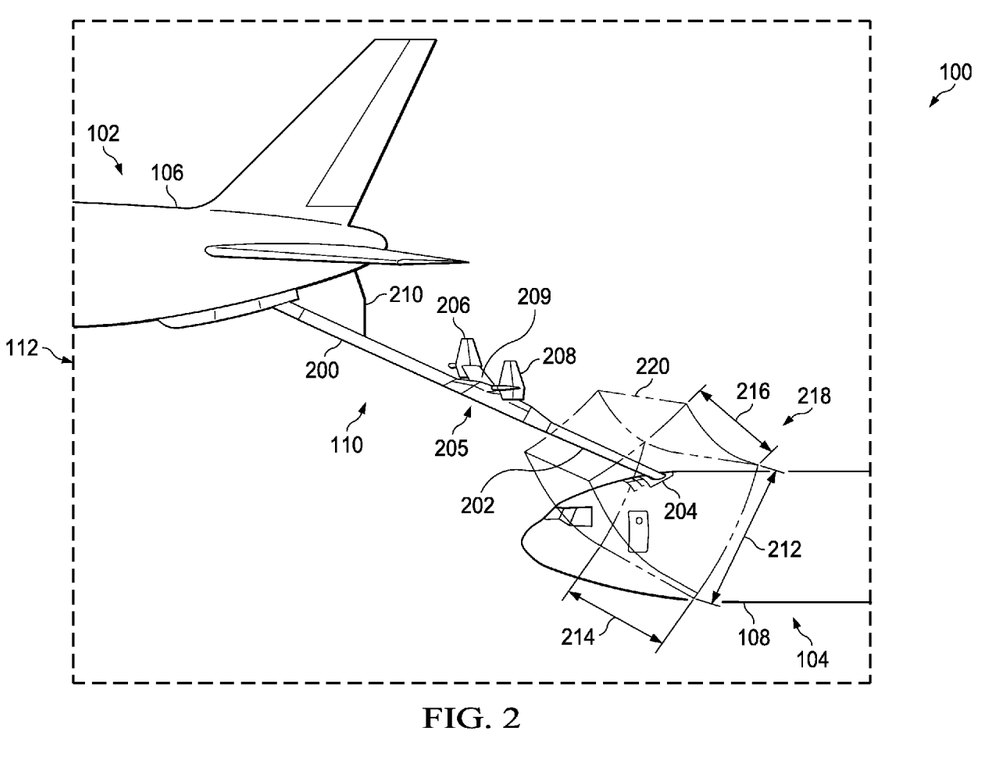
FIG. 2 is a detailed illustration of a refueling boom in accordance with an illustrative embodiment.

With reference now to FIG. 2, a detailed illustration of a refueling boom is depicted in accordance with an illustrative embodiment. In this illustrative example, a more detailed view of section 112 with refueling boom 110 in FIG. 1 is shown.

As depicted, refueling boom 110 includes fixed tube 200, telescoping tube 202, nozzle 204, control surfaces 205, and hoist cable 210. Fixed tube 200 may move in elevation as indicated by arrow 212 under the control of hoist cable 210. Hoist cable 210 may be used to deploy and stow refueling boom 110 in this illustrative example.

Telescoping tube 202 may extend or retract along the direction of arrow 214. Refueling boom 110 also may move in an azimuth direction as indicated by arrow 216. The movement of refueling boom 110 in elevation along the direction of arrow 212 and along the azimuth direction as indicated by arrow 216 may be controlled using control surfaces 205. In some illustrative examples, rudder 206, rudder 208, and elevator 209 control the movement of refueling boom 110. Control surfaces 205 form a force generator for refueling boom 110. In other illustrative examples, other control surfaces in addition to or in place of rudder 206, rudder 208, and elevator 209 may be present to control the movement of refueling boom 110.

As depicted, nozzle 204 may maintain contact with receiver aircraft 108 to transfer fuel to receiver aircraft 108 while refueling boom 110 is within volume 218. When refueling boom 110 reaches boundary 220 of volume 218, nozzle 204 of refueling boom 110 is disconnected from receiver aircraft 108.

In this illustrative example, the disconnection of refueling boom 110 from receiver aircraft 108 occurs prior to refueling boom 110 crossing boundary 220 of volume 218. How soon refueling boom 110 is disconnected prior to crossing boundary 220 of volume 218 may be controlled using a current rate of movement of refueling boom 110 in these illustrative examples.

In these illustrative examples, volume 218 is a volume in which refueling boom 110 may move to or be located inside of such that refueling boom 110 provides a desired level of performance in transferring fuel. If refueling boom 110 crosses boundary 220, refueling boom 110 may no longer provide a desired level of performance in transferring fuel.

For example, if refueling boom 110 crosses boundary 220 of volume 218, refueling boom 110 may be uncontrollable by rudder 206 and rudder 208. In other words, an aerodynamic stall may occur. Further, alignment between nozzle 204 and receiver aircraft 108 may not be maintained in a desired manner such that refueling boom 110 may become bent or other components used to manage refueling boom 110 may no longer operate as desired.

In these illustrative examples, volume 218 may be an operationally effective fueling boom limit. In some cases, volume 218 may be smaller than the actual limits for desired operation of refueling boom 110 to occur while providing a safety margin. For example, when training new boom operators, the desired safety margin may be larger than when experienced operators are operating refueling boom 110.

Regardless of the size selected for volume 218, the illustrative embodiments manage the connection of refueling boom 110 to receiver aircraft 108 based on a current rate of movement of refueling boom 110 within volume 218 in these illustrative examples. In particular, refueling boom 110 may be disconnected from receiver aircraft 108 using position limits that are within volume 218. The position limits used may depend in part on the position of refueling boom 110 and the rate of movement of refueling boom 110 within volume 218.

Figure 3:
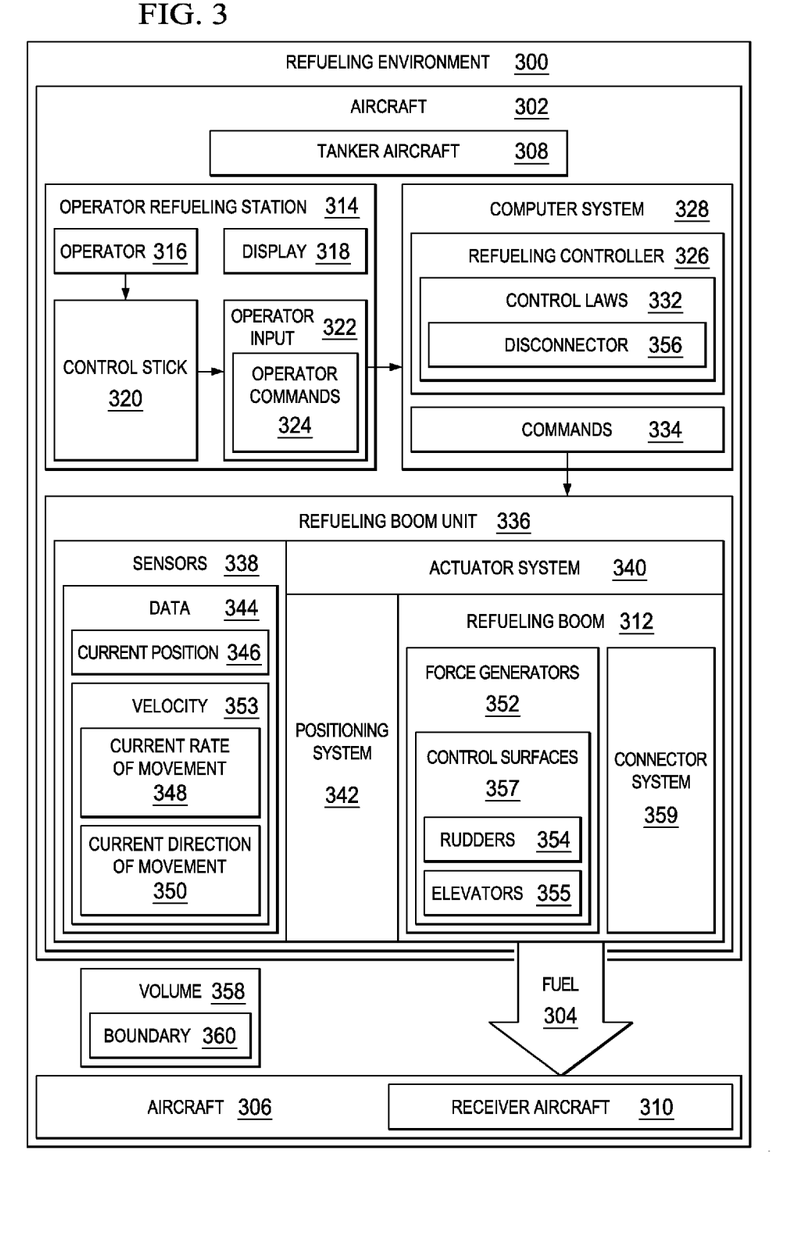
FIG. 3 is an illustration of a block diagram of a refueling environment in accordance with an illustrative embodiment.

Turning now to FIG. 3, an illustration of a block diagram of a refueling environment is depicted in accordance with an illustrative embodiment. Refueling environment 100 in FIG. 1 is an example of one physical implementation for refueling environment 300 shown in block form in FIG. 3.

As depicted, aircraft 302 may provide fuel 304 to aircraft 306. Aircraft 302 is tanker aircraft 308, while aircraft 306 is receiver aircraft 310. In this illustrative example, fuel 304 is transferred from tanker aircraft 308 to receiver aircraft 310 using refueling boom 312.

Operator refueling station 314 provides a location for operator 316 to control refueling boom 312. As depicted, operator refueling station 314 includes display 318 and control stick 320. Display 318 is configured to display information about refueling boom 312 as well as other information about the refueling operation to transfer fuel 304 to receiver aircraft 310.

Operator 316 may manipulate control stick 320 to generate operator input 322. In other words, as operator 316 manipulates control stick 320, control stick 320 generates operator input 322. In these illustrative examples, operator input 322 takes the form of operator commands 324.

As depicted, operator commands 324 are received by refueling controller 326. Refueling controller 326 may take the form of hardware, software, or a combination of the two. When software is used, the operations performed by refueling controller 326 may be implemented in program code configured to be run on a processor unit. When hardware is employed, the hardware may include circuits that operate to perform the operations in refueling controller 326.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted, refueling controller 326 may be implemented in computer system 328. Computer system 328 is one or more computers. When more than one computer is present in computer system 328, those computers may be in communication with each other via a communications medium such as a network. In these illustrative examples, refueling controller 326 may include control laws 332. Control laws 332 may be implemented as software, hardware, or a combination of the two. As depicted, control laws 332 are configured to control refueling boom 312. The control of refueling boom 312 by control laws 332 may include taking into account operator commands 324 from operator input 322 received from operator refueling station 314.

In these illustrative examples, refueling controller 326 may process operator commands 324 from operator input 322 using control laws 332 to generate commands 334. Commands 334 are sent to refueling boom unit 336. As depicted, refueling boom unit 336 includes sensors 338, actuator system 340, refueling boom 312, and positioning system 342. Commands 334 are commands that are used by at least one of actuator system 340 and positioning system 342 in these illustrative examples.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C.

In these illustrative examples, sensors 338 are configured to generate data 344 about refueling boom 312. Data 344 may include at least one of current position 346, current rate of movement 348, current direction of movement 350, and other suitable information.

Current position 346 is the current position of refueling boom 312. Current position 346 may be measured in a number of different ways. For example, current position 346 may be measured as degrees of refueling boom 312 relative to its connection to aircraft 302. For example, current position 346 of refueling boom 312 may be measured as azimuth and elevation in which these values have units in degrees. Current position 346 also may include the current telescope length. The values for the length have units which may be in feet. Of course, other units may be used instead of degrees and feet. For example, the units may be radians and meters.

In these illustrative examples, current rate of movement 348 is a current speed at which refueling boom 312 moves. Current rate of movement 348 may include the rate of movement for different types of movement of refueling boom 312. For example, current rate of movement 348 may include at least one of a pitch rate, a roll rate, a telescope rate, a lateral rate, a vertical rate, and other types of rates of movement.

Current rate of movement 348 may be measured using a number of different types of units. For example, current rate of movement 348 may be measured in radians per second, degrees per second, feet per minute, meters per second, or some other type of unit.

In some illustrative examples, current rate of movement 348 also may include a direction such as current direction of movement 350. Current direction of movement 350 is the current direction in which refueling boom 312 moves. Current direction of movement 350 may be measured in a number of different ways. For example, current direction of movement 350 may be measured, for example, based on changes in elevation, azimuth, roll, and other suitable parameters. When both current rate of movement 348 and current direction of movement 350 are used, these two pieces of information in data 344 form velocity 353.

In these illustrative examples, sensors 338 may include at least one of an inertial measurement unit, a position sensor, an accelerometer, a global positioning system device, and other suitable devices. In some illustrative examples, one or more of sensors 338 may be associated with refueling boom 312.

In these illustrative examples, actuator system 340 may be configured to control movement of refueling boom 312. In particular, actuator system 340 may control extension or retraction of refueling boom 312 as well as other components. Positioning system 342 is configured to control movement of refueling boom 312. For example, positioning system 342 may control at least one of current rate of movement 348 and current direction of movement 350 of refueling boom 312.

In these illustrative examples, positioning system 342 may take the form of a number of force generators 352. The number of force generators 352 may include a number of control surfaces 357. The number of control surfaces 357 may be, for example, a number of rudders 354 and a number of elevators 355. In these illustrative examples, actuator system 340 may control the position of the number of rudders 354 and the number of elevators 355.

As depicted, refueling controller 326 includes disconnector 356. Disconnector 356 may be implemented in control laws 332 in these illustrative examples. Disconnector 356 may operate to cause refueling boom 312 to disconnect from receiver aircraft 310 prior to refueling boom 312 reaching boundary 360 of volume 358.

This disconnection may be performed using connector system 359. Connector system 359 is configured to connect refueling boom 312 to receiver aircraft 310 and also to disconnect refueling boom 312 from receiver aircraft 310. Connector system 359 may include a number of receiver plates and latches. When connected, the latches connect to the receiver plates on the nozzle of refueling boom 312. The number of receiver plates may then be used to disengage latches in the receiver receptacle in receiver aircraft 310 to disconnect refueling boom 312 from receiver aircraft 310 when disconnector 356 triggers a disconnect of refueling boom 312 from receiver aircraft 310.

In this illustrative example, volume 358 is a volume in which desired operation of refueling boom 312 may occur. As depicted, disconnector 356 may cause refueling boom 312 to disconnect from receiver aircraft 310 based on at least one of current position 346 and current rate of movement 348 of refueling boom 312 within volume 358.

With current rate of movement 348, disconnector 356 may cause refueling boom 312 to disconnect when the current rate of movement 348 exceeds a threshold rate of movement. This threshold rate of movement may change based on the position of refueling boom 312 relative to the boundaries of volume 358 in these illustrative examples. For example, as refueling boom 312 moves closer to boundary 360 in volume 358, the threshold rate that triggers disconnector 356 to disconnect refueling boom 312 is lower than the threshold rate when the refueling boom is farther away from boundary 360 of volume 358. Thus, refueling boom 312 may be disconnected from receiver aircraft 310 at appropriate times, rather than in the middle of volume 358. As a result, refueling boom unit 336 may provide for optimal disconnection from receiver aircraft 310 in refueling environment 300.

Further, in the illustrative examples, disconnector 356 may check for current direction of movement 350. If current direction of movement 350 is away from boundary 360, then disconnector 356 may not perform checks as to whether to disconnect refueling boom 312 from receiver aircraft 310.

For example, disconnector 356 may identify a closest portion of boundary 360 to refueling boom 312. Disconnector 356 may then not determine whether current direction of movement 350 is away from the closest portion of boundary 360. If current direction of movement 350 is away from the closest portion of boundary 360, then disconnector 356 will not disconnect refueling boom 312 and does not need to make any determinations about whether to disconnect refueling boom 312.

Figure 4:
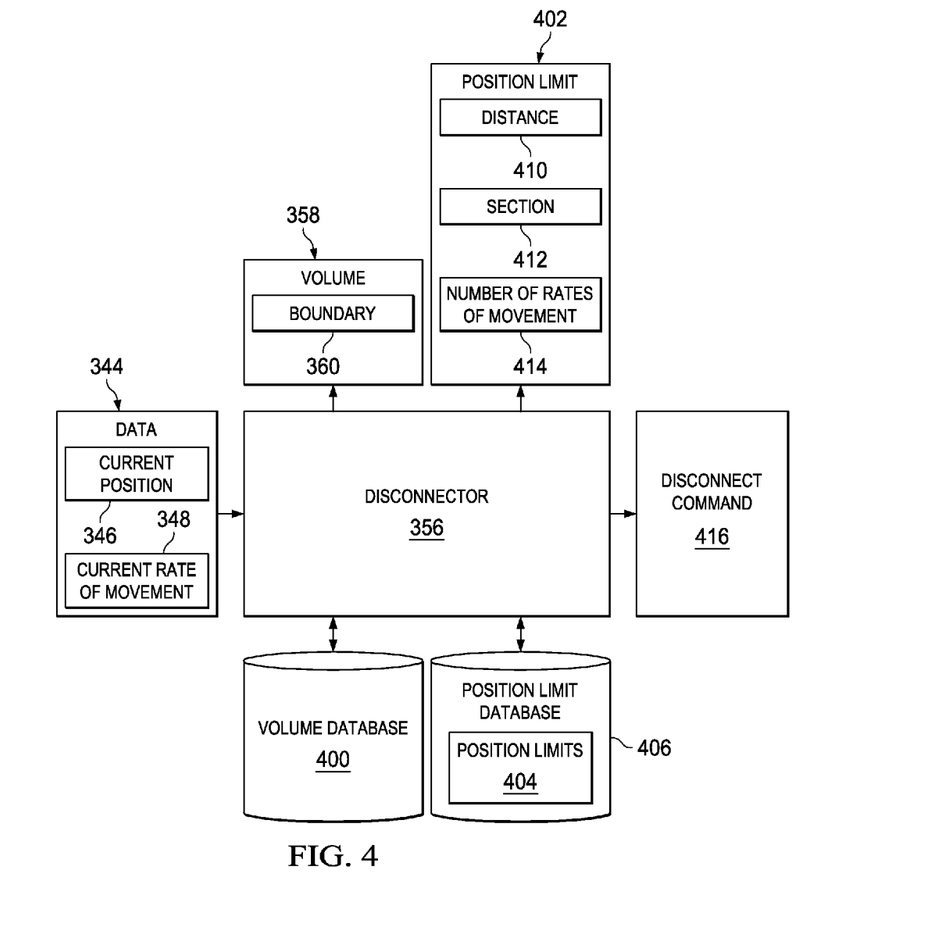
FIG. 4 is an illustration of a flow diagram of the operation of a disconnector in accordance with an illustrative embodiment.

Turning now to FIG. 4, an illustration of a flow diagram of the operation of a disconnector is depicted in accordance with an illustrative embodiment. In this depicted example, operations performed by disconnector 356 and data flow relative to disconnector 356 are illustrated.

As depicted, disconnector 356 receives data 344 as an input in determining whether refueling boom 312 should be disconnected from receiver aircraft 310 in FIG. 3. For example, disconnector 356 uses current rate of movement 348 of refueling boom 312 to determine whether to disconnect refueling boom 312 from receiver aircraft 310. In other words, refueling boom 312 may be disconnected from receiver aircraft 310 based on current rate of movement 348 of refueling boom 312 within volume 358.

In other illustrative examples, disconnector 356 uses current position 346 of refueling boom 312 to determine whether to disconnect refueling boom 312 from receiver aircraft 310. As a result, refueling boom 312 may be disconnected from receiver aircraft 310 based on current position 346 of refueling boom 312 within volume 358.

In these illustrative examples, the determination as to whether to disconnect refueling boom 312 from receiver aircraft 310 is made using data 344 about refueling boom 312 relative to volume 358. This data may be current position 346, current rate of movement 348, or some other suitable type of information in data 344.

Volume 358 may be identified based on receiver aircraft 310. Different receiver aircraft may have different volumes. In other words, volume 358 may vary in size and shape depending on the identification of receiver aircraft 310. The identification of volume 358 may be performed using volume database 400. Volume database 400 identifies volumes for different types of receiver aircraft.

In these illustrative examples, disconnector 356 identifies position limit 402 from position limits 404 in position limit database 406 based on a current rate of movement of refueling boom 312. For example, position limits 404 in position limit database 406 may be identified for refueling boom 312 for receiver aircraft 310 based on current rate of movement 348 of refueling boom 312 within volume 358.

In these illustrative examples, a "position limit" is a position within volume 358 relative to a current rate of movement of refueling boom 312. For example, when refueling boom 312 is moving at a lower rate of movement toward boundary 360 of volume 358, position limit 402 may be closer to boundary 360 than position limit 402 for refueling boom 312 if refueling boom 312 is traveling toward boundary 360 at a higher rate of movement.

In both cases, position limit 402 relative to current rate of movement 348 triggers a disconnection of refueling boom 312 if the current rate of movement of refueling boom 312 exceeds a threshold rate for a position in volume 358. In other words, a "position limit" is a location within volume 358 at which disconnector 356 disconnects refueling boom 312 from receiver aircraft 310 based on current rate of movement 348 exceeding a threshold rate of movement for that location.

Thus, as current rate of movement 348 changes, position limit 402 may change. For example, another position limit from position limits 404 may be used for position limit 402 in place of the current position limit when current rate of movement 348 changes. In some examples, one or more additional position limits from position limits 404 may be used in addition to position limit 402.

As depicted, position limit database 406 may contain position limits for different rates of movement of refueling boom 312 for receiver aircraft 310. Further, position limits 404 in position limit database 406 may also include position limits for other types of receiver aircraft other than receiver aircraft 310.

In these illustrative examples, position limits 404 may be generated using a model, function, or other mechanism. Position limits 404 may be stored in position limit database 406 or in some other data structure such as a table, a linked list, or a flat file. In other illustrative examples, position limits 404 may be generated in real time using the model, function, or other mechanism. In some illustrative examples, user input from operator 316 in FIG. 3 may be used to set one or more of position limits 404.

In these illustrative examples, position limit 402 in position limit database 406 may be defined in a number of different ways. For example, position limit 402 may include an identification of distance 410 from boundary 360 of volume 358 in which the distance is based on current rate of movement 348 of refueling boom 312. Distance 410 may be fixed or may vary for different portions of boundary 360 in volume 358.

In another illustrative example, position limit 402 may be section 412 within volume 358. In this illustrative example, section 412 is a three-dimensional section within volume 358. In other examples, section 412 may be defined as a two-dimensional section based on a direction of movement of refueling boom 312. Further, position limit 402 may be selected for number of rates of movement 414. In other words, the portion of volume 358 for which position limit 402 is valid may be valid when refueling boom 312 has number of rates of movement 414.

In these illustrative examples, number of rates of movement 414 may be one or more rates of movement. Number of rates of movement 414 may be continuous rates of movement or discontinuous rates of movement when more than one rate of movement is present in number of rates of movement 414.

In another illustrative example, position limit 402 may be defined as a section 412 that becomes more restrictive as current rate of movement 348 of refueling boom 312 increases. In one illustrative example, section 412 for position limit 402 may extend from boundary 360 inward into volume 358. As current rate of movement 348 increases, section 412 increases in size to become more restrictive on the position of refueling boom 312 where refueling boom 312 becomes disconnected from receiver aircraft 310.

In one illustrative example, position limits 404 may be based on different directions of movement of refueling boom 312. For example, different position limits may be present in position limits 404 for movement in azimuth, elevation, roll, and other types of directions that refueling boom 312 may move. Thus, for different directions and different current rates of movement, different values for position limits 404 may be present.

In these illustrative examples, when disconnector 356 determines that current rate of movement 348 exceeds position limits 404, disconnector 356 generates disconnect command 416. Disconnect command 416 is sent to refueling boom unit 336 to cause refueling boom unit 336 to disconnect from receiver aircraft 310 in FIG. 3. In these illustrative examples, this disconnection may be caused by commands sent to actuator system 340 that causes connector system 359 to disconnect refueling boom 312 from receiver aircraft 310.

The illustration of refueling environment 300 and the different components in refueling environment 300 in FIG. 3 and FIG. 4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, disconnector 356 by itself may be considered a refueling disconnection system. In other illustrative examples, disconnector 356 and sensors 338 may be considered part of a refueling disconnection system. Of course, other components in addition to these components or in place of these components may be part of a refueling disconnection system.

Further, in another illustrative example, disconnector 356 may be implemented as a component in another portion of refueling controller 326 other than as part of control laws 332. For example, disconnector 356 may be a software program in an integrated circuit or another component that may be located in refueling controller 326 that is separate from control laws 332. Disconnector 356 may interact with control laws 332 even if disconnector 356 is not implemented as part of control laws 332.

As another example, the number of force generators 352 in positioning system 342 may include other types of components other than the number of rudders 354 and the number of elevators 355. For example, the number of force generators 352 may include other types of control surfaces. These other types of control surfaces may include, for example, without limitation, flaps, spoilers, ruddervators, and other types of control surfaces.

In yet another example, disconnector 356 may use a function to generate position limits in addition to or in place of using position limit database 406. The function may take various forms. For example, the function may be a linear function, a quadratic function, or another suitable function for generating position limits in a desired manner. The function may be selected to provide limits for a particular type of receiver. Thus, different functions may be used for different types of receiver aircraft.

The different components shown in FIG. 1 and FIG. 2 may be combined with components in FIG. 3 and FIG. 4, used with components in FIG. 3 and FIG. 4, or a combination of the two. Additionally, some of the components in FIG. 1 and FIG. 2 may be illustrative examples of how components shown in block form in FIG. 3 and FIG. 4 can be implemented as physical structures.

Figure 5:
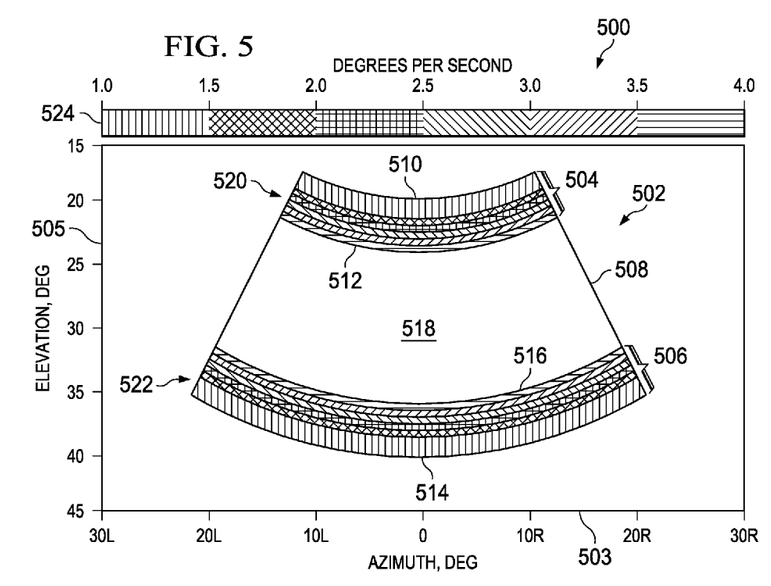
FIG. 5 is an illustration of a graph of elevation position limits for a refueling boom in accordance with an illustrative embodiment.

Turning now to FIG. 5, an illustration of a graph of elevation position limits for a refueling boom is depicted in accordance with an illustrative embodiment. In this illustrative example, graph 500 illustrates position limits 502 for refueling boom 312 in FIG. 3 based on a rate of movement for a boom in which the rate of movement is a change in elevation. A position limit is a position within a volume where a refueling boom will be disconnected from the receiver aircraft. In these illustrative examples, the position limit may be used for a number of different rates of movement of the refueling boom. If the rate of movement for a position limit is not exceeded, the position limit is not used in determining whether to disconnect the refueling boom.

In this illustrative example, x-axis 503 represents azimuth in degrees. Y-axis 505 represents elevation in degrees.

In these illustrative examples, position limits 502 are present in section 504 and section 506 for volume 508. Volume 508 is shown in a two-dimensional view in these figures and is an example of volume 358 in FIG. 3.

In this illustrative example, position limits 502 in section 504 have outer position boundary 510 and inner position boundary 512. Position limits 502 in section 506 have outer position boundary 514 and inner position boundary 516. As depicted, outer position boundary 510 and outer position boundary 514 correspond to a boundary (not shown) for volume 508. Inner position boundary 512 and inner position boundary 516 correspond to an inner portion of volume 508.

Section 518 in volume 508 is a section in which a disconnection of refueling boom 312 from receiver aircraft 310 does not occur. The disconnection of refueling boom 312 by disconnector 356 from receiver aircraft 310 does not occur regardless of current rate of movement 348. Of course, operator initiated methods of disconnection may be implemented.

For example, a boom operator may disconnect refueling boom 312 from receiver aircraft 310 within section 518 of volume 508 if the refueling of receiver aircraft 310 is complete. In other illustrative examples, refueling boom 312 may be disconnected from receiver aircraft 310 by the boom operator for other reasons.

A disconnection of refueling boom 312 from receiver aircraft 310 may occur when refueling boom 312 has a position within section 504 or section 506. The determination of whether refueling boom 312 is disconnected when refueling boom 312 is in section 504 and section 506 depends on current rate of movement 348 in these illustrative examples. The location at which refueling boom 312 may be disconnected from receiver aircraft 310 based on current rate of movement 348 within section 504 and section 506 changes as current rate of movement 348 changes.

As depicted, section 504 has bands 520 and section 506 has bands 522. Bands 520 and bands 522 are bands for position limits that are selectively active depending on current rate of movement 348. When a band is active, the band is used to define a position limit. In this illustrative example, when particular bands are active, they may be identified based on legend 524.

Legend 524 identifies which bands in bands 520 and bands 522 are in force or are active based on the current rate of movement measured in degrees per second. The rate of movement at which a band is activated is referred to as an activation rate. This activation rate may be a rate that exceeds a threshold for safe operation of refueling boom 312 within section 504 or section 506. Thus, when current rate of movement 348 of refueling boom 312 exceeds an activation rate for a particular band, that band remains active even if the current rate of movement of the refueling boom becomes greater than the rate identified for activating a particular band.

Thus, as the current rate of movement increases, an inner band becomes active as a position limit in which the outer band is included to define the position limit. In other words, as more bands are active, the position limit because more restrictive on the movement of refueling boom 312.

In these illustrative examples, a position limit or a band for a position limit is considered to be active when that position limit is to be used in determining whether to disconnect the refueling boom from the receiver aircraft. Thus, different position limits may be used to determine whether to disconnect the refueling boom from the receiver aircraft based on the rate of movement of the refueling boom. The particular position limit is compared to the rate of movement and the location of the refueling boom to determine whether the refueling boom has reached the position limit.

In these illustrative examples, as current rate of movement 348 increases for refueling boom 312, more of bands 520 and bands 522 are active. In other words, more of bands 520 and bands 522 in section 504 and section 506 are active as current rate of movement 348 increases. The bands are configured such that bands closer to outer position boundary 510 and outer position boundary 514 are active when a lower current rate of movement 348 is present. As current rate of movement 348 increases, more bands in bands 520 and bands 522 become active toward inner position boundary 512 and inner position boundary 516, respectively.

In other words, the rate of movement in this example takes into account the type of movement or direction of movement.

Figure 6:
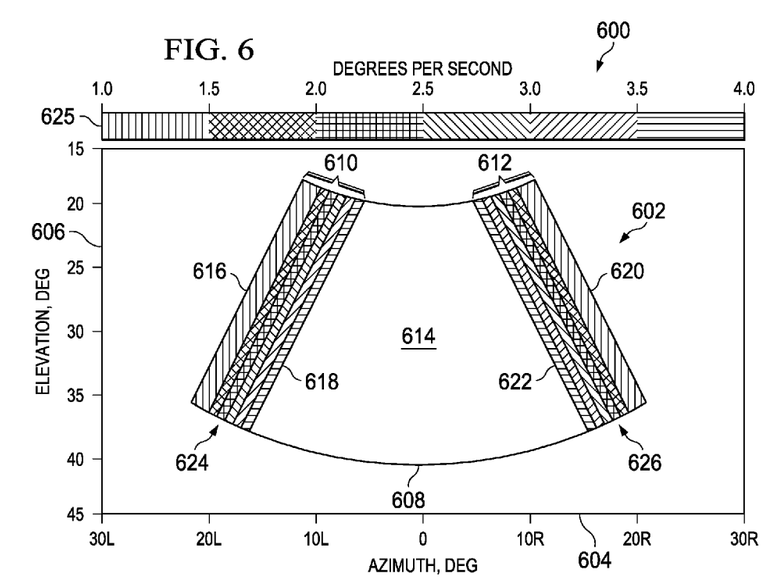
FIG. 6 is an illustration of a graph of roll position limits for a refueling boom in accordance with an illustrative embodiment.

Turning now to FIG. 6, an illustration of a graph of roll position limits for a refueling boom is depicted in accordance with an illustrative embodiment. In this depicted example, graph 600 illustrates position limits 602 for refueling boom 312 based on current rate of movement 348 for refueling boom 312 in FIG. 3. The current rate of movement in this example is based on movement of refueling boom 312 when refueling boom 312 rolls. This rolling movement includes movement in an azimuth direction.

In this illustrative example, x-axis 604 represents azimuth in degrees. Y-axis 606 represents elevation in degrees.

In this depicted example, position limits 602 are located in volume 608. As depicted, position limits 602 are present in section 610 and section 612 of volume 608. Section 614 in volume 608 does not include position limits 602 in these illustrative examples.

Position limits 602 in section 610 have outer position boundary 616 and inner position boundary 618. Position limits 602 in section 612 have outer position boundary 620 and inner position boundary 622. The location at which refueling boom 312 may be disconnected from receiver aircraft 310 based on current rate of movement 348 within section 610 and section 612 changes as current rate of movement 348 changes.

In these illustrative examples, position limits 602 are arranged in bands 624 in section 610 and bands 626 in section 612. As current rate of movement 348 for refueling boom 312 increases, more of bands 624 and bands 626 for position limits 602 are active.

This activation of bands 626 occurs from outer position boundary 620 toward the interior of volume 608. In other words, position limits 602 become more restrictive as more bands are active with increases in the current rate of movement of refueling boom 312. In this manner, these bands may be used to define the current position limit in position limits 602.

In this illustrative example, legend 625 identifies which bands of position limits are active for various rates of movement of the refueling boom. In this illustrative example, the legend identifies which bands are active based on a rate of movement that is in degrees per second.

Bands closer to outer position boundary 616 and outer position boundary 620 are active at lower values for current rate of movement 348 as compared to bands closer to inner position boundary 618 and inner position boundary 622. In other words, as the value for current rate of movement 348 for refueling boom 312 increases, the distance also increases from the position where refueling boom 312 disconnects from outer position boundary 616 and outer position boundary 620.

Figure 7:
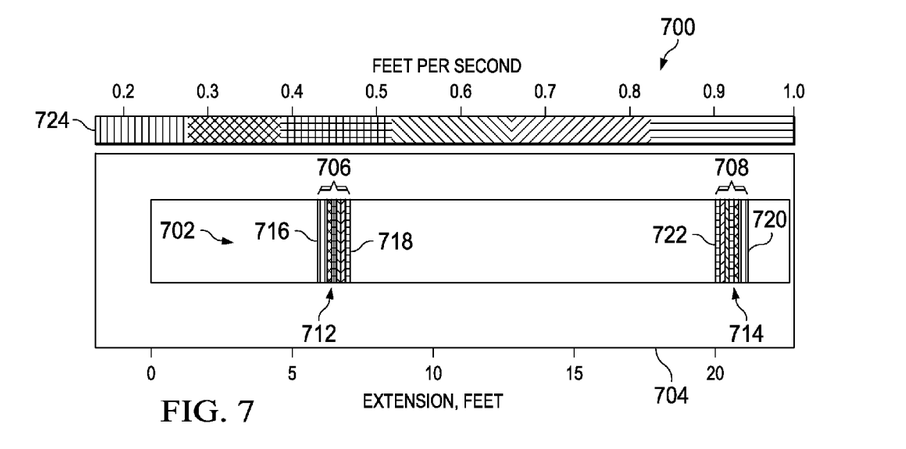
FIG. 7 is an illustration of a graph of telescope position limits for a refueling boom in accordance with an illustrative embodiment.

Turning now to FIG. 7, an illustration of a graph of telescope position limits for a refueling boom is depicted in accordance with an illustrative embodiment. In this depicted example, graph 700 illustrates position limits 702 for refueling boom 312 in FIG. 3.

Position limits 702 are depicted for different values of current rate of movement 348 for refueling boom 312 in a telescoping direction. In other words, these limits are based on extending or retracting refueling boom 312 in a manner that changes the length of refueling boom 312.

As depicted, x-axis 704 represents extension of refueling boom 312 in feet. A y-axis is not present in this example. The only dimension in this example is the extension or length of refueling boom 312.

In this illustrative example, position limits 702 are present in section 706 and section 708. Each of position limits 702 in section 706 and section 708 represent a length of refueling boom 312 within volume 358 in FIG. 3. In other words, refueling boom 312 may extend and retract within volume 358. In this illustrative example, position limits 702 are arranged in bands 712 in section 706 and bands 714 in section 708.

In these illustrative examples, bands 712 for position limits 702 have outer position boundary 716 and inner position boundary 718. In a similar manner, bands 714 for position limits 702 have outer position boundary 720 and inner position boundary 722.

Bands 712 and bands 714 that are active depend on current rate of movement 348 of refueling boom 312 along an axis through refueling boom 312. Legend 724 indicates which bands in bands 712 and bands 714 are active based on current rate of movement 348 in feet per second.

In these illustrative examples, bands closer to outer position boundary 716 and outer position boundary 720 are active at lower values for current rate of movement 348 as compared to bands closer to inner position boundary 718 and inner position boundary 722. The active bands are used to define the position limit that is used to determine whether to disconnect refueling boom 312.

The illustrations of position limits depicted in FIGS. 5-7 are not meant to imply limitations to the manner in which position limits may be implemented. In these illustrative examples, the different position limits are shown as being based on discreet values for current rates of movement of the refueling boom. These position limits may be made continuously variable using a function rather than just position limits stored in a database. In other words, position limit database 406 may be replaced with a function, a model, or a program that generates position limits 404 in FIG. 4 as needed.

Figure 8:
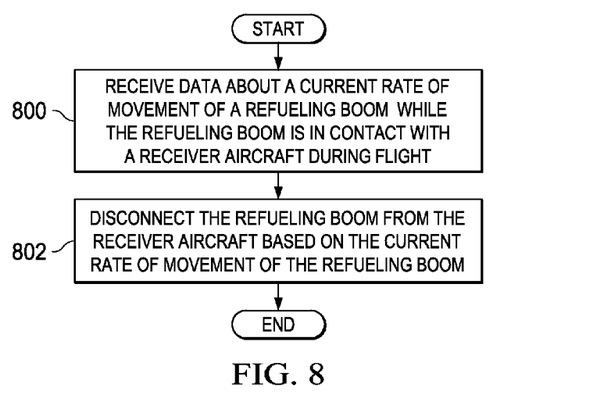
FIG. 8 is an illustration of a flowchart of a process for controlling disconnection of a refueling boom from a receiver aircraft in accordance with an illustrative embodiment.

Turning now to FIG. 8, an illustration of a flowchart of a process for controlling disconnection of a refueling boom from a receiver aircraft is depicted in accordance with an illustrative embodiment. The process illustrated in FIG. 8 may be implemented to control connection of a refueling boom such as refueling boom 312 to receiver aircraft 310 in FIG. 3. The different operations shown in FIG. 8 may be implemented in computer system 328 in FIG. 3. In particular, the process or processes shown in this figure may be implemented as part of disconnector 356 in control laws 332 for refueling controller 326 in one illustrative example.

The process begins by receiving data about a current rate of movement of a refueling boom while the refueling boom is in contact with a receiver aircraft during flight (operation 800). The process disconnects the refueling boom from the receiver aircraft based on the current rate of movement of the refueling boom (operation 802), with the process terminating thereafter.

Figure 9:
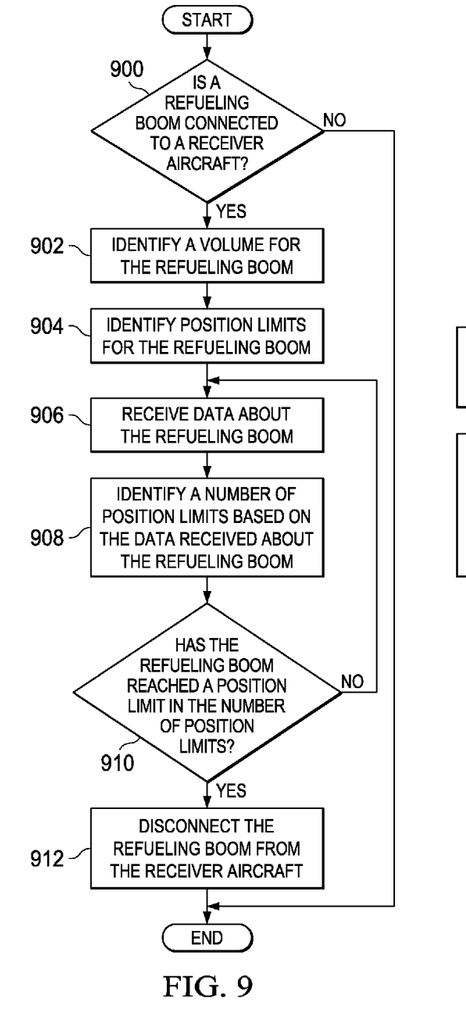
FIG. 9 is an illustration of a flowchart of a process for controlling disconnection of a refueling boom from a receiver aircraft based on a number of position limits in accordance with an illustrative embodiment.

Turning now to FIG. 9, an illustration of a flowchart of a process for controlling disconnection of a refueling boom from a receiver aircraft based on a number of position limits is depicted in accordance with an illustrative embodiment. The process illustrated in FIG. 9 may be implemented to control connection of a refueling boom such as refueling boom 312 from receiver aircraft 310 in FIG. 3. The different operations shown in FIG. 9 may be implemented in computer system 328 in FIG. 3.

The process begins by determining whether a refueling boom is connected to a receiver aircraft (operation 900). If a refueling operation has been completed and the operator has disconnected the refueling boom from the receiver aircraft, the monitoring of the refueling boom for disconnection is no longer needed. Thus, if the refueling boom is not connected to the receiver aircraft, the process terminates.

Otherwise, the process identifies a volume for the refueling boom (operation 902). This volume is identified based on the type of receiver aircraft connected to the refueling boom. Additionally, an operator of the refueling boom unit may also set the limits of the volume. Thereafter, the process identifies position limits for the refueling boom (operation 904). In these illustrative examples, the position limits may be identified based on the receiver aircraft or other factors.

Other factors may include the status of components in the refueling boom unit. For example, if some actuators, force generators, or other components are not operating as desired, the position limits may be selected to take these situations into account. Further, the operator of the refueling boom unit may also set the position limits based on other factors. For example, the experience of the boom operator may dictate what position limits are set for the refueling boom. Additionally, the position limits may take into account the characteristics of the refueling boom and may even include characteristics of the tanker aircraft depending on the particular implementation.

In still other illustrative examples, the position limits may be set by the operator. If the operator sets the position limits, some variance may be made in the position limits up to some threshold. The position limits may not be set beyond limits that may cause undesired operation of the refueling boom, damage the refueling boom, or other undesired effects. For example, an operator may not be allowed to make the position limits greater than a volume based on the type of receiver aircraft. In other words, the type of receiver aircraft may set the threshold for the absolute position limits within the volume.

The process then receives data about the refueling boom (operation 906). In these illustrative examples, this data may include at least one of a current position, a current rate of movement, a current direction of movement, and other suitable data.

Next, the process identifies a number of position limits based on the data received about the refueling boom (operation 908). In these illustrative examples, the number of position limits identified are active position limits identified from the position limits that were identified in operation 904. These active position limits may take the form of bands within the volume. Position limits that are considered active are ones that are used to determine whether the refueling boom should be disconnected from the receiver aircraft. In some examples, the section covered by a band may include the area covered by another band. As the current rate of movement increases, a band may be selected that includes the area covered by a prior band as well as additional areas. In other words, the band may increase in size to make the position limit more restrictive.

In other examples, the bands may cover areas exclusive to each other. With this example, more than one band may be used to define the position limit.

A determination is then made as to whether the refueling boom has reached a position limit in the number of position limits (operation 910). If the refueling boom has reached a position limit in number of position limits, the refueling boom is disconnected from the receiver aircraft (operation 912), with the process terminating thereafter. In operation 910, if the refueling boom has not reached a position limit in the number of position limits, the process returns to operation 906 as described above.

Figure 10:
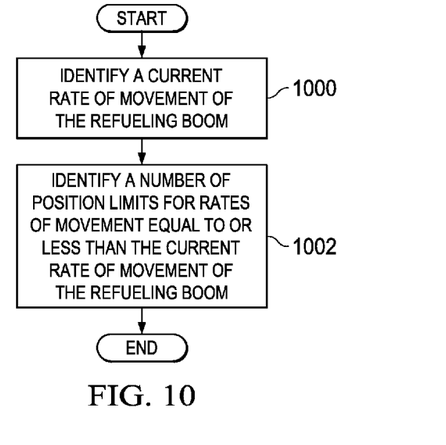
FIG. 10 is an illustration of a flowchart of a process for identifying position limits based on the rate of movement of the boom in accordance with an illustrative embodiment.

Turning now to FIG. 10, an illustration of a flowchart of a process for identifying position limits based on the rate of movement of the boom is depicted in accordance with an illustrative embodiment. The process illustrated in FIG. 10 is an example of an implementation for operation 908 in FIG. 9.

The process begins by identifying a current rate of movement of the refueling boom (operation 1000). The process then identifies a number of position limits for rates of movement equal to or less than the current rate of movement of the refueling boom (operation 1002), with the process terminating thereafter.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 904 in FIG. 9 may be omitted. In some cases, the process may only identify locations of position limits in operation 904. Those locations may generate position boundaries that may be substantially the same in shape as the volume.

Figure 11:
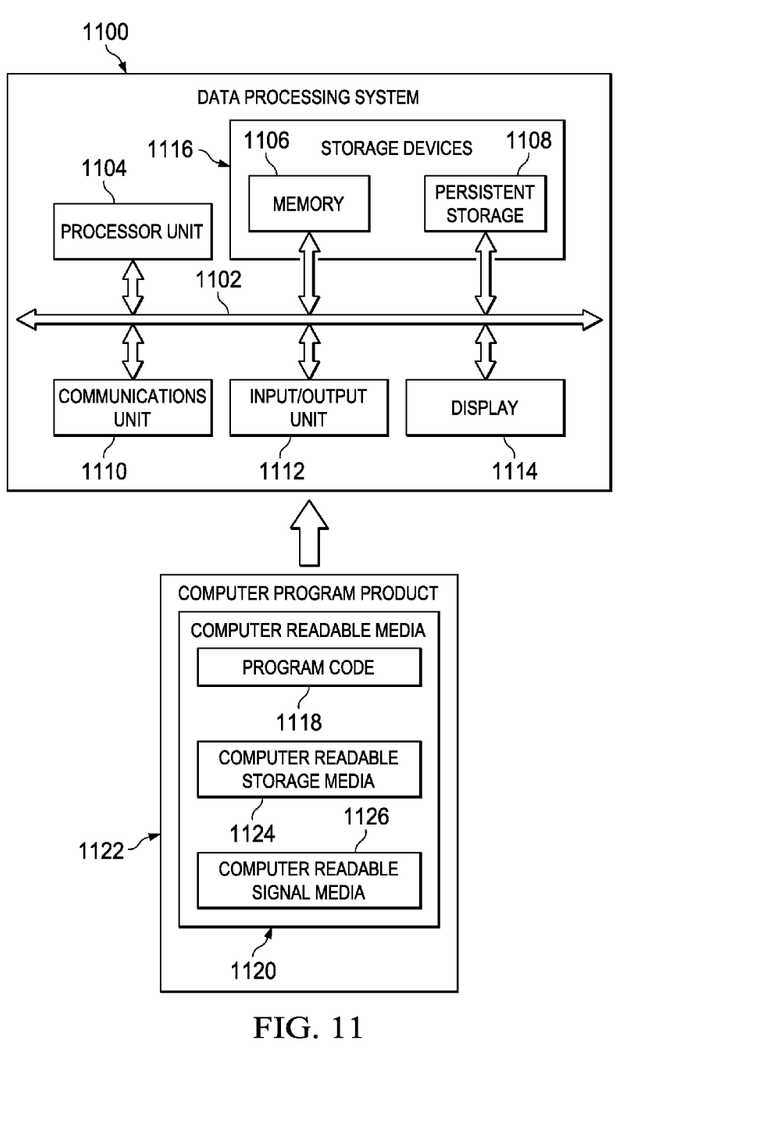
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement one or more computers in computer system 328 in receiver aircraft 310 in FIG. 3.

In this illustrative example, data processing system 1100 includes communications framework 1102, which provides communications between processor unit 1104, memory 1106, persistent storage 1108, communications unit 1110, input/output (I/O) unit 1112, and display 1114. In this example, communication framework may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, data, program code in functional form, and/or other suitable information either on a temporary basis and/or a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1100 are not meant to provide architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code 1118.

Figure 12:
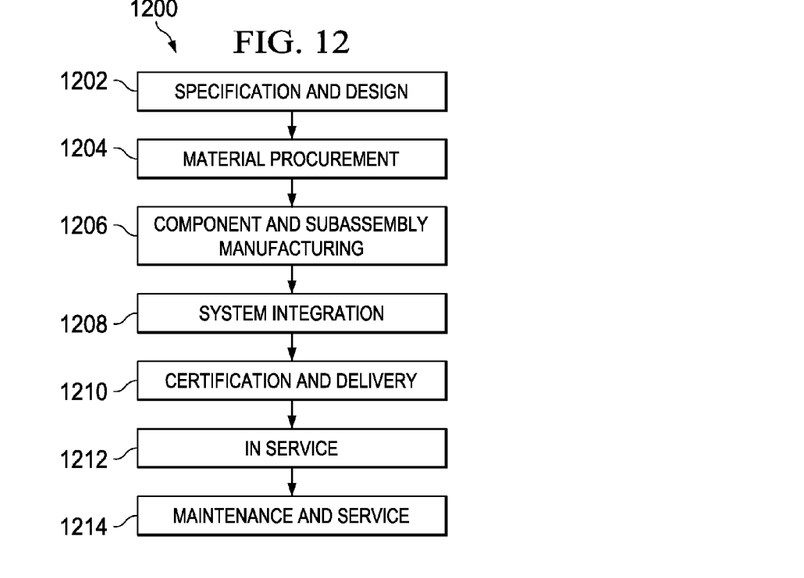
FIG. 12 is an illustration of an aircraft manufacturing and service method in accordance with an illustrative embodiment.
Figure 13:
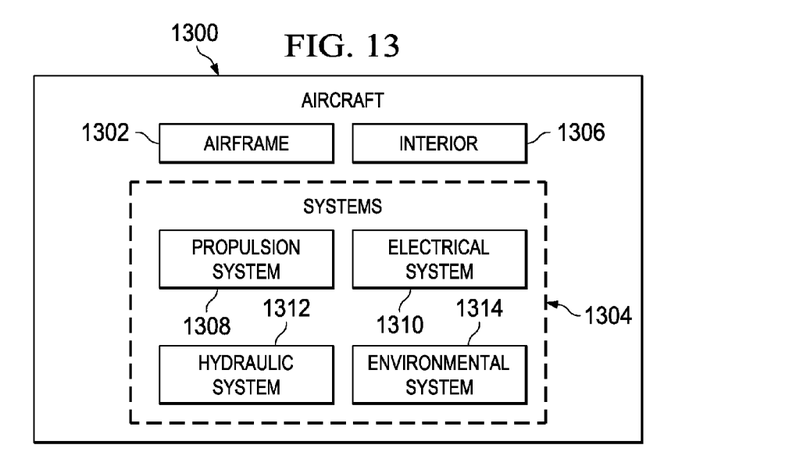
FIG. 13 is a more detailed illustration of an aircraft in accordance with an illustrative embodiment.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. Aircraft 1300 may be one example of aircraft 102 and aircraft 104 shown in FIG. 1.

In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200 in FIG. 12. For example, one or more illustrative embodiments may be implemented to develop aircraft 1300 during specification and design 1202. In another illustrative example, disconnector 356 may be included in aircraft 1300 during system integration 1208. For example, hardware, software, or both hardware and software for disconnector 356 may be implemented in aircraft 1300 during the assembly of aircraft 1300 in system integration 1208. Further, disconnector 356 also may be included in aircraft 1300 during maintenance and service 1214 as a modification, an upgrade, or a refurbishment of aircraft 1300.

Thus, the illustrative embodiments provide a method and apparatus for managing a connection of a refueling boom with a receiver aircraft. In different illustrative embodiments, the rate of movement of the refueling boom and the current position of the refueling boom may be used to determine whether to disconnect the refueling boom from the receiver aircraft. With the use of disconnector 356 in refueling controller 326, a more efficient mechanism may be present for avoiding undesired operation of a refueling boom. With a disconnector, a refueling boom may be disconnected from a receiver aircraft without requiring input from an operator. As a result, the operator may focus on other operations in a refueling process.

Further, the position limits used by disconnector 356 in the different illustrative embodiments may be modified through operator input in addition to the input identified for use in a refueling operation with a receiver aircraft. In this manner, disconnections may occur when a refueling boom moves toward the boundaries of the volume identified for the desired operation of the refueling boom. The different illustrative embodiments provide position limits for disconnecting the refueling boom that vary based on the rate of movement of the refueling boom as well as the current position of the refueling boom. Further, the different illustrative embodiments allow for adjustment of these position limits by an operator.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising: a refueling controller configured to receive data about a current rate of movement of a refueling boom while the refueling boom is in contact with a receiver aircraft during flight, identify a position limit based on the current rate of movement of the refueling boom, and disconnect the refueling boom from the receiver aircraft based on the current rate of movement of the refueling boom, the position limit, and a current position of the refueling boom, wherein the current rate of movement includes at least one of a pitch rate, a roll rate, a telescope rate, a lateral rate, or a vertical rate.

2. The apparatus of claim 1, wherein in being configured to disconnect the refueling boom from the receiver aircraft based on the current rate of movement of the refueling boom and the current position of the refueling boom, the refueling controller is configured to determine whether the refueling boom has reached the position limit based on the current rate of movement of the refueling boom and the current position of the refueling boom and automatically disconnect the refueling boom from the receiver aircraft when the refueling boom has reached the position limit.

3. The apparatus of claim 2, wherein the position limit is based on the current rate of movement of the refueling boom.

4. The apparatus of claim 2, wherein the position limit is based on the current rate of movement of the refueling boom and a current direction of movement of the refueling boom.

5. The apparatus of claim 2, wherein the position limit selected for the current rate of movement covers a distance from a boundary of a volume selected for the receiver aircraft, wherein the distance for the position limit is based on the current rate of movement of the refueling boom.

6. The apparatus of claim 2, wherein the position limit is selected based on an operator input.

7. The apparatus of claim 5, wherein the volume is selected as one in which desired operation of the refueling boom occurs.

8. The apparatus of claim 2, wherein the position limit is part of a number of position limits that have an outer position boundary and an inner position boundary.

9. A refueling controller for a tanker aircraft, the refueling controller comprising:

the refueling controller configured to receive data about a current rate of movement of a refueling boom within a volume selected for a receiver aircraft while the refueling boom is in contact with the receiver aircraft during flight; identify a number of position limits based on the current rate of movement of the refueling boom; determine whether the refueling boom has exceeded a position limit in the number of position limits based on a current position and the current rate of movement of the refueling boom; and disconnect the refueling boom of the receiver aircraft if the position limit in the number of position limits has been exceeded.

10. The refueling controller of claim 9, wherein the current rate of movement is selected from at least one of a pitch rate, a roll rate, a telescope rate, a lateral rate, or a vertical rate.

11. The refueling controller of claim 9, wherein the number of position limits has an outer position boundary and an inner position boundary with respect to the volume.

12. The refueling controller of claim 9, wherein a disconnector in the refueling controller is configured to receive the data about the current rate of movement of the refueling boom within the volume selected for the receiver aircraft while the refueling boom is in contact with the receiver aircraft during flight; identify the number of position limits based on the current rate of movement of the refueling boom; determine whether the refueling boom has exceeded the position limit in the number of position limits based on the current position and the current rate of movement of the refueling boom; and disconnect the refueling boom of the receiver aircraft if the position limit in the number of position limits has been exceeded.

13. The refueling controller of claim 12, wherein the disconnector is comprised of at least one of hardware or software.

14. A method for controlling disconnection of a refueling boom, the method comprising: receiving data about a current rate of movement of the refueling boom while the refueling boom is in contact with a receiver aircraft during flight; identifying a number of position limits for use in disconnecting the refueling boom based on the current rate of movement of the refueling boom; and disconnecting the refueling boom from the receiver aircraft based on the current rate of movement of the refueling boom, the number of position limits, and a current position of the refueling boom, wherein the current rate of movement is selected from at least one of a pitch rate, a roll rate, a telescope rate, a lateral rate, or a vertical rate.

15. The method of claim 14 wherein disconnecting the refueling boom from the receiver aircraft based on the current rate of movement of the refueling boom and the current position of the refueling boom comprises:
  determining whether the refueling boom has exceeded the position limit in the number of position limits based on the current position and the current rate of movement of the refueling boom; and
  disconnecting the refueling boom of the receiver aircraft if the position limit in the number of position limits has been exceeded.

16. The method of claim 14, wherein receiving the data about the current rate of movement of the refueling boom while the refueling boom is in contact with the receiver aircraft during flight and disconnecting the refueling boom from the receiver aircraft based on the current rate of movement of the refueling boom and the current position of the refueling boom comprises:
  receiving, by a refueling controller, the data about the current rate of movement of the refueling boom while the refueling boom in contact with the receiver aircraft during flight; and
  disconnecting, by the refueling controller, the refueling boom from the receiver aircraft based on the current rate of movement of the refueling boom and the current position of the refueling boom.

17. The method of claim 14 wherein identifying the number of position limits for use in disconnecting the refueling boom based on the current rate of movement of the refueling boom comprises:
  identifying the number of position limits for use in disconnecting the refueling boom based on the current rate of movement of the refueling boom, wherein the number of position limits is identified from position limits received from at least one of a database or an operator.

18. The apparatus of claim 1, wherein a band defines the position limit within a section of a volume selected for the receiver aircraft, wherein the band is configured to selectively activate based on the current rate of movement of the refueling boom, and wherein the refueling controller is configured to disconnect the refueling boom from the receiver aircraft when the refueling boom is within the band and the band is active.

19. The apparatus of claim 1, wherein the position limit selected for the current rate of movement covers a distance from a boundary of a volume selected for the receiver aircraft, wherein the distance for the position limit is based on the current rate of movement of the refueling boom, and wherein the distance includes an inner band and an outer band.

* * * * *